US 6,723,161 B2

(12) United States Patent
Langenmayr et al.

(10) Patent No.: US 6,723,161 B2
(45) Date of Patent: Apr. 20, 2004

(54) METHOD FOR OXIDIZING ORGANIC PIGMENT

(75) Inventors: Eric Jon Langenmayr, Bryn Mawr, PA (US); Richard Shu-Hua Wu, Fort Washington, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/298,894

(22) Filed: Nov. 18, 2002

(65) Prior Publication Data

US 2003/0101909 A1 Jun. 5, 2003

Related U.S. Application Data

(60) Provisional application No. 60/333,954, filed on Nov. 30, 2001.

(51) Int. Cl.⁷ .......................... C08K 5/00; C09D 11/06; C09C 1/56
(52) U.S. Cl. ..................... 106/493; 106/31.6; 106/412; 106/478; 106/493; 106/494; 106/495; 106/496; 106/497; 106/498
(58) Field of Search ................................ 106/412, 493, 106/494, 495, 496, 497, 498, 31.6, 478

(56) References Cited

U.S. PATENT DOCUMENTS

| 4,929,279 A | * | 5/1990 | Hays ........................ 106/412 |
| 5,059,249 A | * | 10/1991 | Hays ........................ 106/412 |
| 5,846,307 A | | 12/1998 | Nagasawa et al. ....... 106/31.75 |
| 5,861,447 A | | 1/1999 | Nagasawa et al. .......... 523/161 |
| 6,074,466 A | | 6/2000 | Iwasa ..................... 106/31.64 |
| 6,171,382 B1 | | 1/2001 | Stübbe et al. .............. 106/31.9 |
| 2002/0014184 A1 | | 2/2002 | Yeh et al. ................... 106/472 |

FOREIGN PATENT DOCUMENTS

| DE | 901 706 C1 | 1/1954 | |
| EP | 0896 986 A1 | 2/1999 | ............. C09C/1/48 |

OTHER PUBLICATIONS

Kalumuck, Kenneth M. et al; "The Use Of Cavitating Jets To Oxide Organic Compounds In Water", Proceedings of FEDSM'98—413; (1998), pp. 1–8, no month.

Cintas, Pedro et al; "Green chemistry, The sonochemical approach", Paper 9/00593E, (1999), no month.

Suslick, Kenneth S, "Sonochemistry", Kirk–Othmer Encyclopedia of Chemical Technology, (2001), no month.

* cited by examiner

*Primary Examiner*—Anthony J. Green
(74) *Attorney, Agent, or Firm*—Ronald D. Bakule

(57) ABSTRACT

A method for oxidizing an organic pigment including dispersing the pigment in an aqueous medium and exposing the dispersed pigment to ultrasonic radiation, whereby the exposed pigment exhibits from 3 to 10 microequivalents of carboxylic acid, or salts thereof, per square meter of pigment surface.

6 Claims, No Drawings

METHOD FOR OXIDIZING ORGANIC PIGMENT

CROSS REFERENCE TO RELATED PATENT APPLICATIONS

This is a non-provisional application of prior pending U.S. provisional application Ser. No. 60/333,954 filed Nov. 30, 2001.

This invention relates to method for oxidizing an organic pigment. In particular the invention relates to a method for oxidizing organic pigment, particularly carbon black, by dispersing the pigment in water and exposing the dispersed pigment to ultrasonic radiation, optionally in the presence of an oxidizing agent, until the exposed pigment has from 3 to 10 microequivalents of carboxylic acid, or salts thereof, per square meter of its surface.

In inks, toners, paints and coatings some organic pigments such as, for example, carbon black are not suitable for use in the form in which they are produced. Surface modification, including oxidation, can result in carbon black which is useful for the previously mentioned uses. Various methods of oxidizing the surface of carbon black including gas phase oxidation and liquid phase oxidation have been disclosed. Specific chemical oxidation agents that have been used include ozone, hydrogen peroxide, sodium hypochlorite, nitric acid, and potassium permanganate. These oxidizing agents are effective but in each case there are significant disadvantages including the formation of hazardous emissions, toxic byproducts as well as the need for extensive purification of the oxidized carbon black. There is a clear need for an effective process to oxidize organic pigments such as carbon black without the disadvantages cited above.

U.S. Pat. No. 6,171,382 discloses aqueous carbon black dispersions containing carbon black, surfactants, and water formed using bead mills, ultrasonic mills, and/or an ultra-turrax.

U.S. Pat. No. 5,861,447 discloses an aqueous pigment ink composition suitable for ink jet recording including an oxidized carbon black using a hypohalous acid and/or salt thereof, and a water-soluble cationic polymer or oligomer.

It is desired to provide useful and improved methods for oxidizing organic pigments, the dispersed oxidized pigments so formed, and inks containing the oxidized pigments.

In a first aspect of the present invention there is provided a method for oxidizing an organic pigment comprising dispersing said pigment in an aqueous medium and exposing said dispersed pigment to ultrasonic radiation, whereby said exposed pigment comprises from 3 to 10 microequivalents of carboxylic acid, or salts thereof, per square meter of pigment surface.

In the method of this invention an organic pigment is oxidized. By "organic pigment" herein is meant a pigment which is predominantly an organic compound or mixture of organic compounds, explicitly including carbon black.

Carbon black is the generic name for small particle size carbon particles formed in the gas phase by the thermal decomposition of hydrocarbons and includes, for example, materials known in the art as furnace black, lampblack, channel black, acetylene black.

Organic pigments include colored pigments which may be blue, brown, cyan, magenta, green, violet, red, yellow, or mixtures thereof. Suitable classes of colored pigments include, for example, anthroquinones, phthalocyanine blues, phthalocyanine greens, diazos, monoazos, quinacridones, (thio)indigoids, heterocyclic yellows, pyranthrones, and the like.

In the method of this invention organic pigment is dispersed in an aqueous medium. The aqueous medium is predominantly water but may include other water-miscible compounds. The organic pigment is dispersed by conventional methods including shaking or stirring in order to distribute the particles in the aqueous medium, the dispersion method not being considered critical to the invention; further, exposing the organic pigment in the aqueous medium to ultrasonic radiation is sufficient to maintain the pigment ifn a dispersed form.

In the method of this invention the dispersed pigment is exposed to ultrasonic radiation. Ultrasonic acoustic irradiation generates the growth and collapse of cavitation bubbles within a liquid and the collapse of these bubbles produces extremely high local temperatures and pressures. This phenomena produces both mechanical (surface cleaning, solids disruption) as well as chemical (production of free radicals) effects. In water the radical species formed are H* and OH*. The use of ultrasonic irradiation to oxidize an aqueous dispersion of an organic pigment would oxidize the surface as well as disperse the solid agglomerates.

There are various ways to generate ultrasonic acoustic waves including an ultrasonic cleaning bath, a direct immersion ultrasonic horn, and flow reactors. Ultrasonic cleaning baths are of limited utility as the intensity is low (about 1 W/cm$^2$). Ultrasonic horns are more useful as the intensity is in the range of 50 to 500 W/cm2. Cavitating jets (such as those produced by Dynaflow, Inc., Fulton, Md.) have advantages over other ultrasonic devices in that the cavitation can be made much more intense, they are easy to scale up and the cavitating jets are more efficient. Use of such jets for oxidation of dilute aqueous solutions of p-nitrophenol has shown oxidation efficiencies twenty times higher than with an ultrasonic horn. The exposure of the dispersed pigment to ultrasonic radiation may be conducted at one time or via multiple exposures, i.e., by batch, multiple batch, semi-continuous, or continuous techniques.

In one embodiment of this invention the dispersed pigment is exposed to ultrasonic radiation and to a chemical oxidizing agent such as, for example, ozone, nitric acid, chromic acid, hydrogen peroxide, nitrogen oxides, peroxydisulfuric acid, potassium permanganate, and hypohalous acid or salts thereof. Preferred is the use of ultrasonic radition and hydrogen peroxide. The exposure to a chemical oxidizing agent may occur before, during, or after exposure to ultrasonic radiation. Preferred is concurrent exposure to ultrasonic radiation and to a chemical oxidizing agent.

The exposed pigment has from 3 to 10 microequivalents of carboxylic acid, or salts thereof, per square meter of the pigment surface. The carboxylic acid groups on the surface of the exposed pigment is determined by titration with NaOH (Matsumura and Takahashi, Carbon, 1976, Vol 14, pp 163–167). By surface area of "the pigment surface" herein is meant the surface area of the pigment prior to effecting the method of this invention as measured by the nitrogen B.E.T. method, as is well-known in the art.

The ink of this invention may contain one or more colorants in addition to the oxidized organic pigment. In a preferred embodiment an ink jet ink is formed from the pigment dispersion of this invention. If the ink is an ink jet ink the optional colorants may be selected from the group of pigments and dyes generally useful in ink jet printing. Suitable organic pigments include non-oxidized carbon black, azo compounds, phthalocyanine pigments, quinacridone pigments, anthraquinone pigments, dioxazine pigments, indigo, thioindigo pigments, perynone pigments, perylene pigments, and isoindolene. Suitable inorganic pigments include titanium dioxide, iron oxide, and other metal powders. Generally, the total amount of pigment(s) used is less that 10%, preferably 3–8%, by weight based on the total weight of the ink. The pigment particle size must be sufficiently small that pigment particles will not clog the nozzles on the printing device in which the ink is to be used. Typical nozzle openings on thermal ink jet printers are 30–60 microns in diameter. Preferably, the pigment particle size is from 0.05 to 2 microns, more preferably not more than one micron and most preferably not more than 0.3 microns.

The ink composition may include a polymeric binder, preferably an emulsion-polymerized addition polymer. Preferably the binder is present at a level of 0.1 to 10%, more preferably 1 to 5%, by weight based on the weight of the ink composition. The preparation of emulsion polymerized addition polymers by batch, semi-batch, gradual addition, or continuous processes are well known to those skilled in the art for example as described in EP 747,456 A.

The ink composition of the present invention may also include water miscible or soluble materials such as humectants, dispersants, penetrants, chelating agents, co-solvents, defoamers, buffers, biocides, fungicides, viscosity modifiers, bactericides, surfactants, anti-curling agents, anti-bleed agents and surface tension modifiers, all as is known in the art. Useful humectants include ethylene glycol, 1,3-propanediol, 1,4-butanediol, 1,4-cyclohexanedimethanol, 1,5-pentanediol, 1,6-hexanediol, 1,8-octanediol, 1,2-propanediol, 1,2-butanediol, 1,3-butanediol, 2,3-butanediol, diethylene glycol, triethylene glycol, tetraethylene glycol, polyethylene glycol with average molecular weight of 200, 300, 400, 600, 900, 1000, 1500 and 2000, dipropylene glycol, polyproylene glycol with average molecular weight of 425, 725, 1000, and 2000, 2-pyrrolidone, 1-methyl-2-pyrrolidone, 1-methyl-2-piperidone, N-ethylacetamide, N-methlpropionamide, N-acetyl ethanolamine, N-methylacetamide, formamide, 3-amino-1,2-propanediol, 2,2-thiodiethanol, 3,3-thiodipropanol, tetramethylene sulfone, butadiene sulfone, ethylene carbonate, butyrolacetone, tetrahydrofurfuryl alcohol, glycerol, 1,2,4-butenetriol, trimethylpropane, pantothenol, Liponic EG-1. Preferred humectants are polyethylene glycol with average molecular weight of 400 to 1000, 2-pyrrolidone 2,2 thiodiethanol, and 1,5 pentanediol. Preferred penetrants include n-propanol, isopropyl alcohol, 1,3-propanediol, 1,2-hexanediol, and hexyl CARBITOL™. The amount of humectant used is determined by the properties of the ink and may range from 1–30%, preferably 5–15%, by weight, based on the total weight of the ink.

The amount of defoaming agent in the ink, if used, will typically range from 0.05–0.5% by weight, based on the total weight of the ink. The amount required depends on the process used in making the pigment dispersion component of the ink. Defoaming agents useful in forming aqueous dispersions of pigments are well known in the art and commercially available examples include Surfynol 104H and Surfynol DF-37 (Air Products, Allentown, Pa.).

The ink compositions of the present invention may be prepared by any method known in the art for making such compositions, for example, by mixing, stirring or agitating the ingredients together using any art recognized technique to form an aqueous ink. The procedure for preparation of the ink composition of the present invention is not critical except to the extent that the ink composition is homogenous.

The following examples are presented to illustrate the invention.

EXAMPLE 1

Preparation of a Stable Dispersion of Oxidized Carbon Black

Deionized water (150 g) and carbon black (15 g, Raven 3500, Colombian Chemicals) are charged to a 250 ml sonochemical reaction flask (tapered walls available from Aldrich) fitted with a high intensity ultrasonic horn (13 mm ti, 600 W, Aldrich). The dispersion of carbon black and water is exposd to the high intensity ultrasonic irradiation for 16 hours. After the ultrasonic irradiation is complete, the carbon black dispersion is filtered through a 1 micron glass microfiber filter (25 mm, Gelmann) to remove large particulates. The pH of the aqueous dispersion is 2.8 due to acidic functionality formed on the carbon black surface. The oxidized carbon black has 7.2 microequivalents of carboxylic acid/$m^2$. The particle size of the carbon black dispersion using a Microtrac UPA150 particle size analyzer is 150 nm.

EXAMPLE 2

Preparation of a Stable Dispersion of Oxidized Carbon Black

Deionized water (150 g), carbon black (15 g, Raven 3500, Colombian Chemicals) and hydrogen peroxide (30%, 15 ml) are charged to a 250 ml sonochemical reaction flask (tapered walls available from Aldrich) fitted with a high intensity ultrasonic horn (13 mm tip, 600 W, Aldrich). The dispersion of carbon black and water is exposed to the high intensity ultrasonic irradiation for 16 hours. After the ultrasonic reaction is complete, the carbon black dispersion is filtered through a 1 micron glass microfiber filter (25 mm, Gelmann) to remove large particulates. The pH of the aqueous dispersion is 2.3, believed due to acidic functionality formed on the carbon black surface. The oxidized carbon black has 8.5 microequivalents of carboxylic acid/$m^2$. The particle size of the carbon black in dispersion using a Microtrac UPA150 particle size analyzer is 130 nm.

EXAMPLE 3

Preparation of a Stable Dispersion of Oxidized Carbon Black

A slurry of carbon black (15 g, Raven 3500, Colombian Chemicals) and deionized water (150 g) are charged into a cavitation reactor as described in K. M. Kalumuck and G. L. Chahine, "The Use of Cavitating Jets to Oxidize Organic Compounds in Water", Proceedings of FEDSM"98, 1998 ASME Fluids Engineering Division Summer Meeting, June 21–25, 198, Washington D.C. The jet flow loop is driven by a positive displacement pump producing a flow of 5 gpm at pressure up to 1000 psi. The cavitation reaction chamber consists of 6 stages, each stage has a jet orifice plate with 4 orifices and a downstream stagnation plate which induces strong bubble collapse. The dispersion of carbon black and water is pumped thorugh the system for 6 hours and then filtered through a 1 micron glass microfiber filter (25 mm, Gelmann) to remove large particulates. The pH of the aqueous dispersion is 2.2 due to acidic functionality formed on the carbon black surface. The oxidized carbon black has 8.3 microequivalents of carboxylic acid/$m^2$. The particle size of the carbon black dispersion measured using a Microtrac UPA150 particle size analyzer is 115 nm.

EXAMPLE 4

Preparation of a Stable Dispersion of Oxidized Carbon Black

A slurry of carbon black (15 grams, Raven 3500, Colombian Chemicals), deionized water (150 grams) and hydrogen peroxide (30%, 15 mls) are charged into a cavitation reactor according to the method of Example 3. The jet flow loop is driven by a positive displacement pump producing a flow of 5 gpm at pressure up to 1000 psi. The cavitation reaction chamber consists of 6 stages, each stage has a jet orifice plate with 4 orifices and a downstream stagnation plate which induces strong bubble collapse. The dispersion of carbon black and water is pumped thorough the system for 6 hours and then filtered through a 1 micron glass microfiber filter (25 mm, Gelmann) to remove large particulates. The pH of the aqueous dispersion is 2.1 due to acidic functionality formed on the carbon black surface. The oxidized carbon black has 8.6 microequivalents of carboxylic acid/$m^2$. The particle size of the carbon black dispersion measured using a Microtrac UPA150 particle size analyzer is 110 nm.

EXAMPLE 5

Preparation of an Ink Jet Ink Incorporating Oxidized Carbon Black

An ink jet ink formulation containing 6.5 g N-methyl-2-pyrrolidone, 4.0 g polyethylene glycol-600, 10.2 g 1,3-propanediol, 40 g oxidized carbon black dispersion as made in Example 4 above (10% solids), and 59.3 g of deionized water is made. The ink is well mixed then used to fill an HP51629A inkjet cartridge. The cartridge is printed to dryness with no evidence of nozzle clogging, misdirection, or nozzle crusting and gives high quality printed product having an optical density of 1.55.

What is claimed is:

1. A method for oxidizing an organic pigment comprising dispersing said pigment in an aqueous medium and exposing said dispersed pigment to ultrasonic radiation, whereby said exposed pigment comprises from 3 to 10 microequivalents of carboxylic acid, or salts thereof, per square meter of the surface of said exposed pigment.

2. The method of claim 1 wherein said dispersed pigment is further contacted with an oxidizing agent.

3. The method of claim 1 or claim 2 wherein said organic pigment is carbon black.

4. An organic pigment dispersion formed by the method of claim 1 or claim 2.

5. An ink comprising the organic pigment dispersion of claim 4.

6. An inkjet ink comprising the organic pigment dispersion of claim 4.

* * * * *